US012693843B2

(12) United States Patent
Ishikawa et al.

(10) Patent No.: US 12,693,843 B2
(45) Date of Patent: Jul. 28, 2026

(54) SERVER AND SOFTWARE DISTRIBUTION SYSTEM

(71) Applicant: TOYOTA JIDOSHA KABUSHIKI KAISHA, Toyota (JP)

(72) Inventors: Tomoyasu Ishikawa, Nagoya (JP); Hiroshi Inoue, Nagoya (JP); Shunsuke Tanimori, Arlington, VA (US); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 247 days.

(21) Appl. No.: 18/366,793

(22) Filed: Aug. 8, 2023

(65) Prior Publication Data

US 2024/0118882 A1    Apr. 11, 2024

(30) Foreign Application Priority Data

Oct. 5, 2022    (JP) ................................. 2022-160957

(51) Int. Cl.
*G06F 8/65* (2018.01)
*G07C 5/00* (2006.01)

(52) U.S. Cl.
CPC ............... *G06F 8/65* (2013.01); *G07C 5/008* (2013.01)

(58) Field of Classification Search
CPC .......... G06F 8/65; G07C 5/008; H04L 67/34; H04W 4/44; H04W 8/245
See application file for complete search history.

(56) References Cited

U.S. PATENT DOCUMENTS

| | | | | |
|---|---|---|---|---|
| 10,891,123 | B2 * | 1/2021 | Kiyama | G07C 5/008 |
| 11,023,223 | B2 * | 6/2021 | Ishikawa | G06F 8/654 |
| 11,875,144 | B2 * | 1/2024 | Lin | H04L 67/125 |
| 2006/0294514 | A1 * | 12/2006 | Bauchot | G06F 8/65 |
| | | | | 717/173 |
| 2015/0363210 | A1 * | 12/2015 | Wehrman | G06F 8/65 |
| | | | | 701/31.5 |
| 2017/0242678 | A1 * | 8/2017 | Sangameswaran | G06F 8/656 |
| 2018/0005254 | A1 * | 1/2018 | Bai | B60W 10/00 |
| 2019/0163466 | A1 * | 5/2019 | Kiyama | H04W 4/44 |
| 2019/0205115 | A1 * | 7/2019 | Gomes | H04W 4/50 |
| 2020/0218443 | A1 * | 7/2020 | Narayan | B60K 35/60 |
| 2021/0011709 | A1 * | 1/2021 | Itatsu | B60R 16/02 |
| 2021/0224056 | A1 * | 7/2021 | John | H04W 4/46 |
| 2022/0014604 | A1 * | 1/2022 | Satoh | G06F 21/572 |
| 2022/0405171 | A1 * | 12/2022 | Shelke | G06F 11/1433 |
| 2023/0159025 | A1 * | 5/2023 | Tummala | G08G 1/0965 |
| | | | | 701/26 |

FOREIGN PATENT DOCUMENTS

| | | | | |
|---|---|---|---|---|
| CN | 113590164 A | * 11/2021 | ............... | G06F 8/61 |
| JP | 2017149323 A | 8/2017 | | |

* cited by examiner

*Primary Examiner* — Daxin Wu
(74) *Attorney, Agent, or Firm* — Dickinson Wright, PLLC

(57) ABSTRACT

A server that distributes software, includes one or more processors configured to: classify a plurality of vehicles that is software distribution targets into a first vehicle and a second vehicle; and prioritize software distribution to the second vehicle over software distribution to the first vehicle. The first vehicle is configured to wirelessly communicate with the server, and receive the software distributed by the server directly from the server. The second vehicle is configured to communicate with mobile equipment that wirelessly communicates with the server, and receive the software distributed by the server via the mobile equipment.

9 Claims, 6 Drawing Sheets

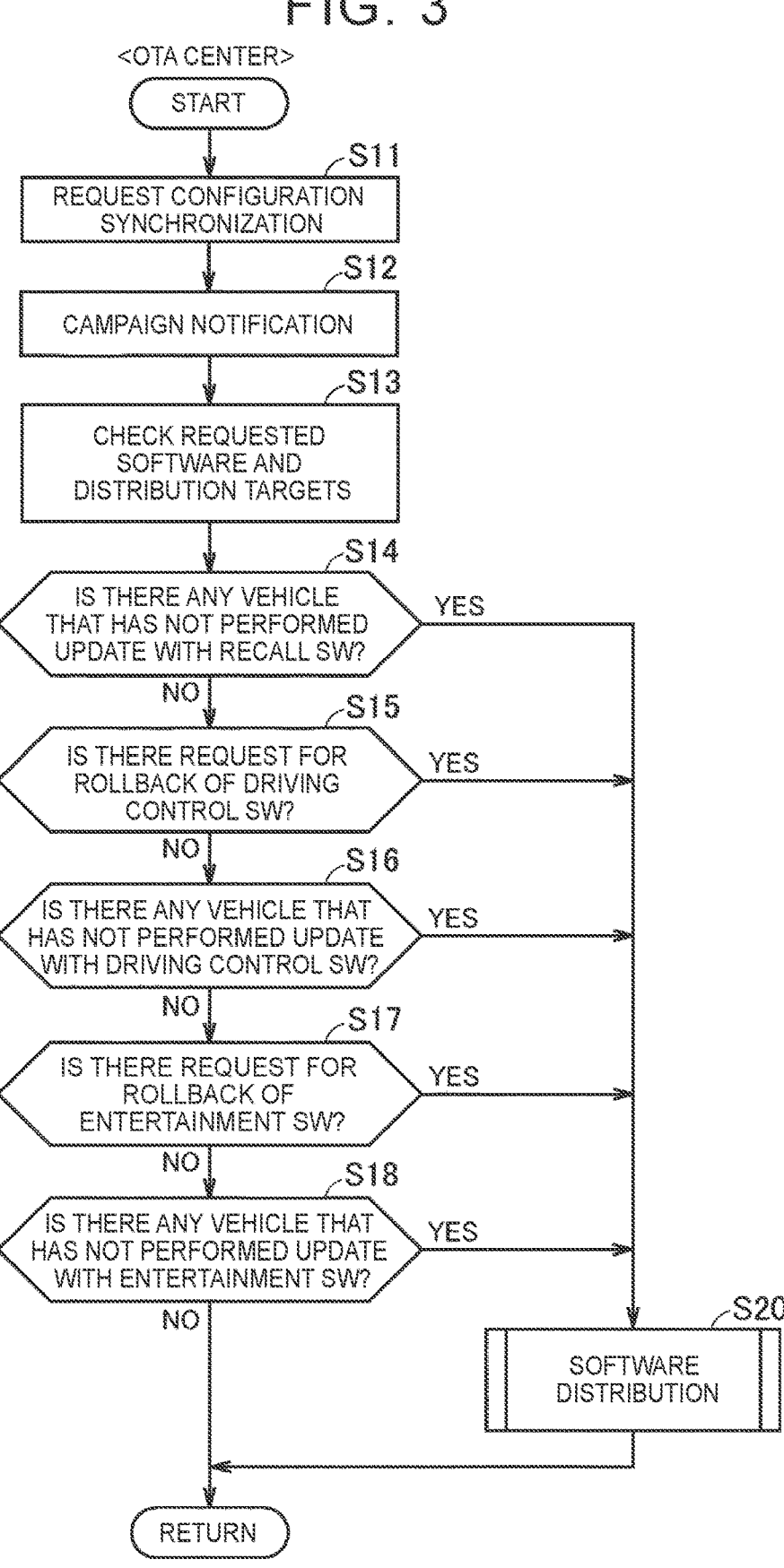

<OTA CENTER>

START

S11
REQUEST CONFIGURATION
SYNCHRONIZATION

S12
CAMPAIGN NOTIFICATION

S13
CHECK REQUESTED
SOFTWARE AND
DISTRIBUTION TARGETS

S14
IS THERE ANY VEHICLE
THAT HAS NOT PERFORMED
UPDATE WITH RECALL SW?    YES

NO

S15
IS THERE REQUEST FOR
ROLLBACK OF DRIVING
CONTROL SW?    YES

NO

S16
IS THERE ANY VEHICLE THAT
HAS NOT PERFORMED UPDATE
WITH DRIVING CONTROL SW?    YES

NO

S17
IS THERE REQUEST FOR
ROLLBACK OF
ENTERTAINMENT SW?    YES

NO

S18
IS THERE ANY VEHICLE THAT
HAS NOT PERFORMED UPDATE
WITH ENTERTAINMENT SW?    YES

NO

S20
SOFTWARE
DISTRIBUTION

RETURN

FIG. 5

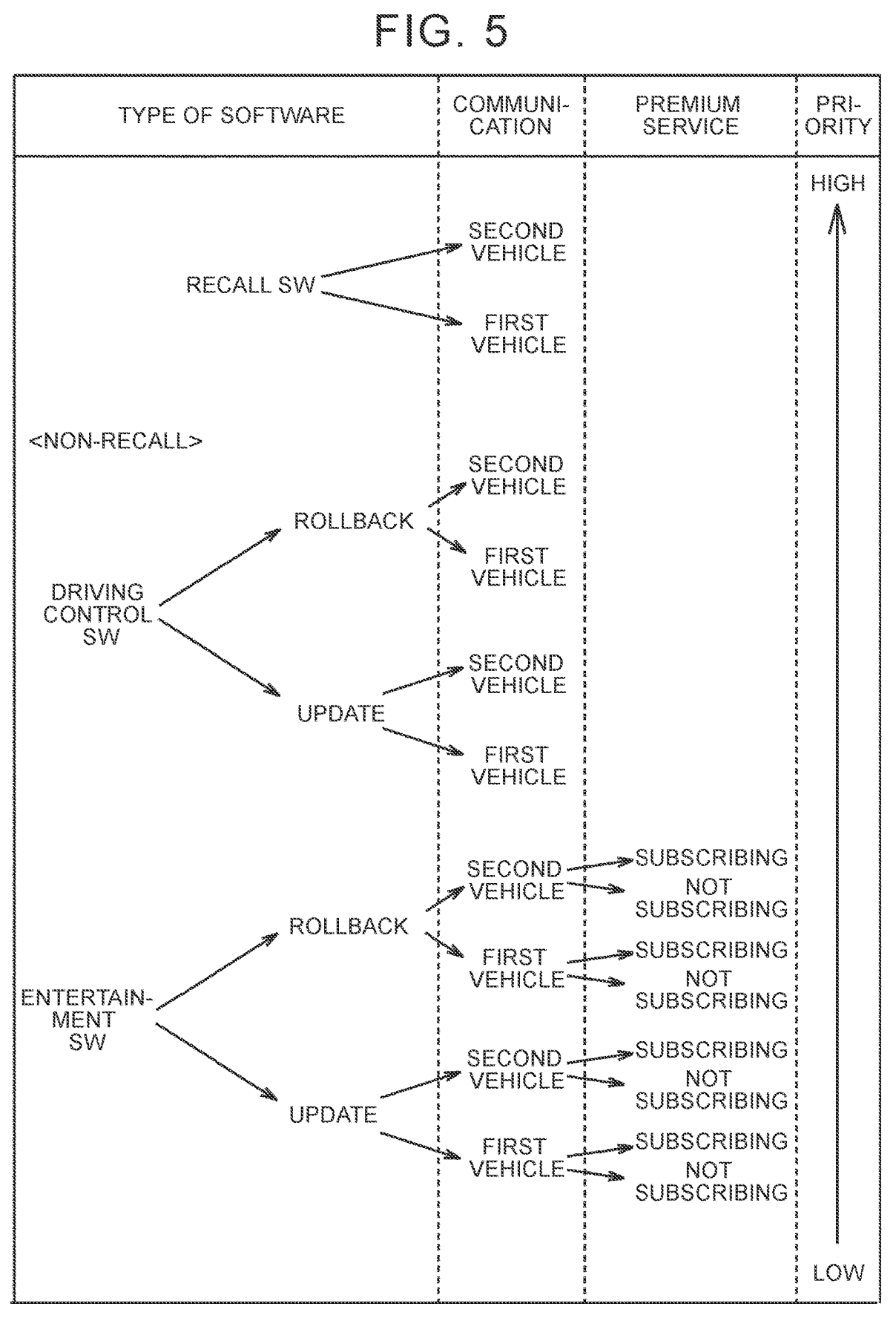

| TYPE OF SOFTWARE | | | COMMUNI-CATION | PREMIUM SERVICE | PRI-ORITY |
|---|---|---|---|---|---|

HIGH

RECALL SW → SECOND VEHICLE

RECALL SW → FIRST VEHICLE

<NON-RECALL>

DRIVING CONTROL SW → ROLLBACK → SECOND VEHICLE

ROLLBACK → FIRST VEHICLE

DRIVING CONTROL SW → UPDATE → SECOND VEHICLE

UPDATE → FIRST VEHICLE

ENTERTAIN-MENT SW → ROLLBACK → SECOND VEHICLE → SUBSCRIBING

SECOND VEHICLE → NOT SUBSCRIBING

ROLLBACK → FIRST VEHICLE → SUBSCRIBING

FIRST VEHICLE → NOT SUBSCRIBING

ENTERTAIN-MENT SW → UPDATE → SECOND VEHICLE → SUBSCRIBING

SECOND VEHICLE → NOT SUBSCRIBING

UPDATE → FIRST VEHICLE → SUBSCRIBING

FIRST VEHICLE → NOT SUBSCRIBING

LOW

FIG. 6

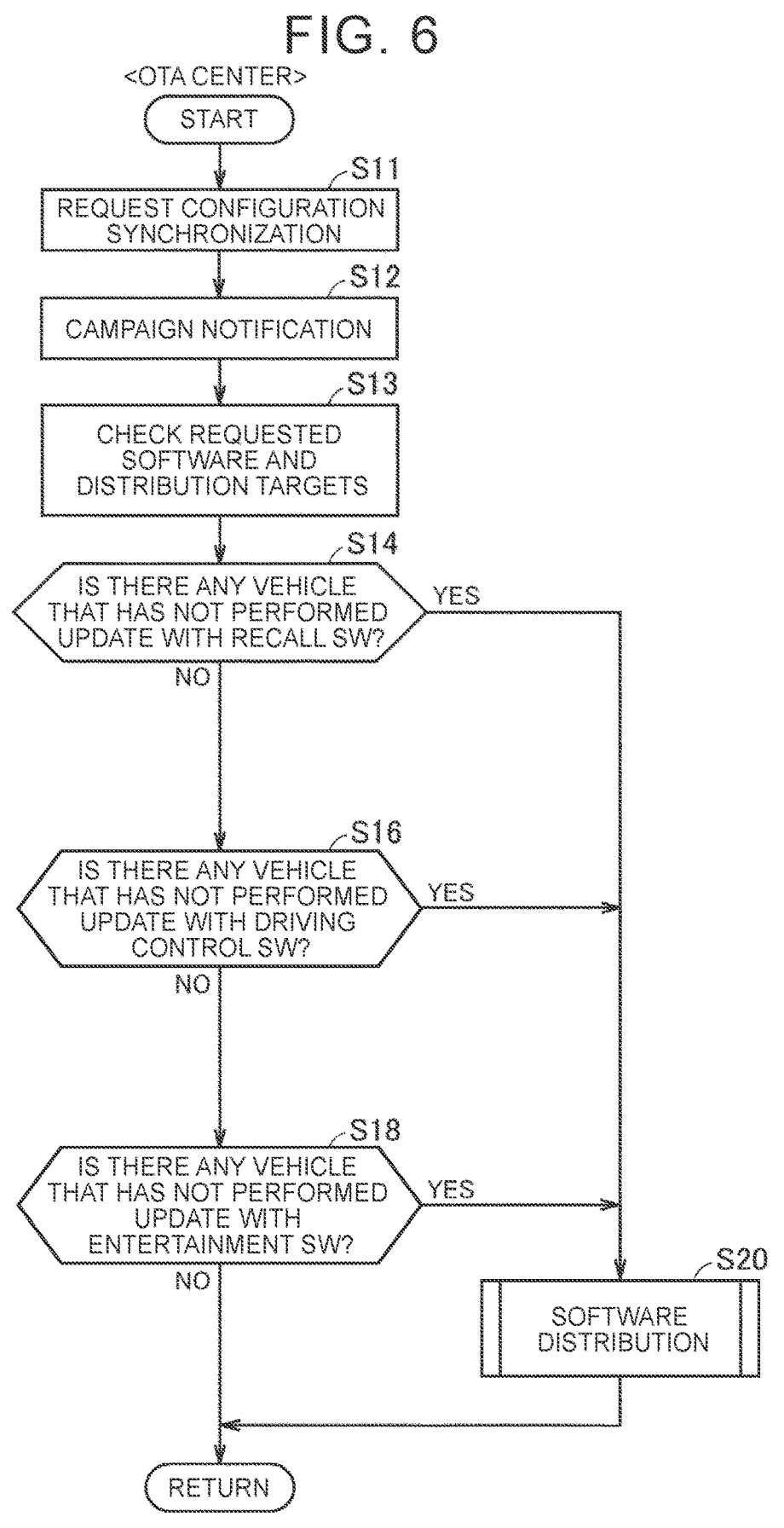

<OTA CENTER>

START

S11
REQUEST CONFIGURATION
SYNCHRONIZATION

S12
CAMPAIGN NOTIFICATION

S13
CHECK REQUESTED
SOFTWARE AND
DISTRIBUTION TARGETS

S14
IS THERE ANY VEHICLE
THAT HAS NOT PERFORMED
UPDATE WITH RECALL SW? — YES

NO

S16
IS THERE ANY VEHICLE
THAT HAS NOT PERFORMED
UPDATE WITH DRIVING
CONTROL SW? — YES

NO

S18
IS THERE ANY VEHICLE
THAT HAS NOT PERFORMED
UPDATE WITH
ENTERTAINMENT SW? — YES

NO

S20
SOFTWARE
DISTRIBUTION

RETURN

SERVER AND SOFTWARE DISTRIBUTION SYSTEM

CROSS-REFERENCE TO RELATED APPLICATION

This application claims priority to Japanese Patent Application No. 2022-160957 filed on Oct. 5, 2022, incorporated herein by reference in its entirety.

BACKGROUND

1. Technical Field

The present disclosure relates to a server and a software distribution system.

2. Description of Related Art

Japanese Unexamined Patent Application Publication No. 2017-149323 (JP 2017-149323 A) discloses a technique of updating software on an electronic control unit (ECU) mounted on a vehicle by Over-The-Air (OTA) technology.

SUMMARY

A vehicle can download new software for an in-vehicle ECU from an OTA center by wirelessly communicating with the OTA center. In the vehicle, the target ECU (ECU whose software is to be updated) then sequentially performs installation and activation of the downloaded software. A software update can thus be performed.

However, not all vehicles can wirelessly communicate with the OTA center. Software is not distributed from the OTA center to those vehicles that cannot wirelessly communicate with the OTA center. It is desirable that software can also be distributed to those vehicles that do not have a function to wirelessly communicate directly with the OTA center (hereinafter referred to as "OTA access function") by the OTA technology.

The present disclosure makes it possible to perform a suitable software update using the OTA technology even on those vehicles that do not have the OTA access function.

A server according to a first aspect of the present disclosure is configured to distribute software. The server includes one or more processors configured to classify a plurality of vehicles that is software distribution targets into a first vehicle and a second vehicle, and to prioritize software distribution to the second vehicle over software distribution to the first vehicle. The first vehicle is configured to wirelessly communicate with the server and to receive the software distributed by the server directly from the server. The second vehicle is configured to communicate with mobile equipment that wirelessly communicates with the server, and to receive the software distributed by the server via the mobile equipment.

A software distribution system according to a second aspect of the present disclosure includes: the server of the first aspect; the plurality of vehicles; and the mobile equipment. The mobile equipment is configured to send the software acquired from the server to the second vehicle by wireless communication.

According to the present disclosure, a suitable software update can be performed using the OTA technology even for those vehicles that do not have the OTA access function.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 shows the configuration of a software distribution system according to an embodiment of the present disclosure;

FIG. 3 is a flowchart showing the procedure of a software distribution method according to the embodiment of the present disclosure;

FIG. 5 shows the priorities of distribution determined by the software distribution method according to the embodiment of the present disclosure; and FIG. 6 shows a modification of the process shown in FIG. 3.

DETAILED DESCRIPTION OF EMBODIMENTS

Figure 2:
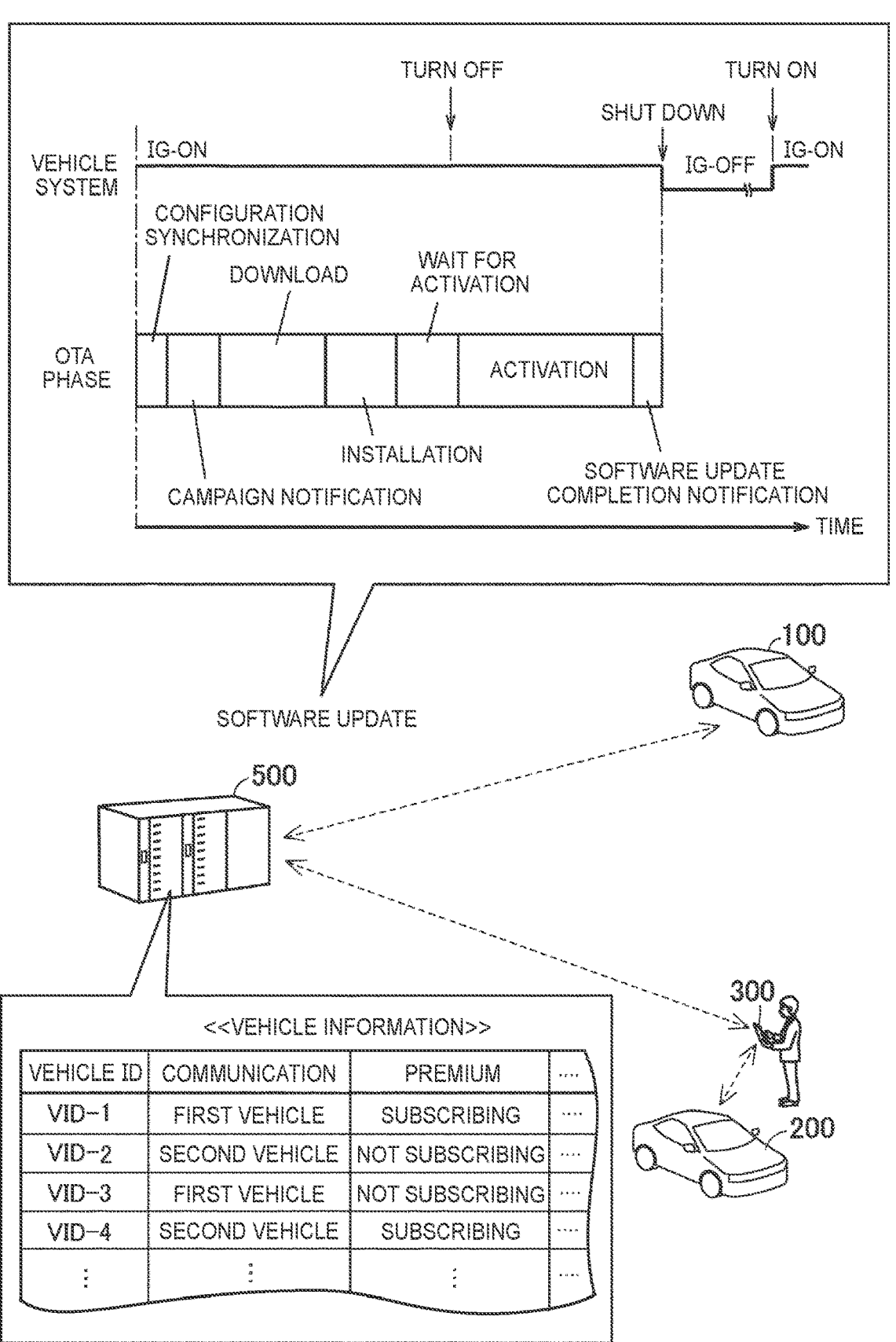
FIG. 2 illustrates an overview of a software update method according to the embodiment of the present disclosure.

An embodiment of the present disclosure will be described in detail with reference to the drawings. The same or corresponding parts are denoted by the same signs throughout the drawings, and description thereof will not be repeated.

Figure 1:
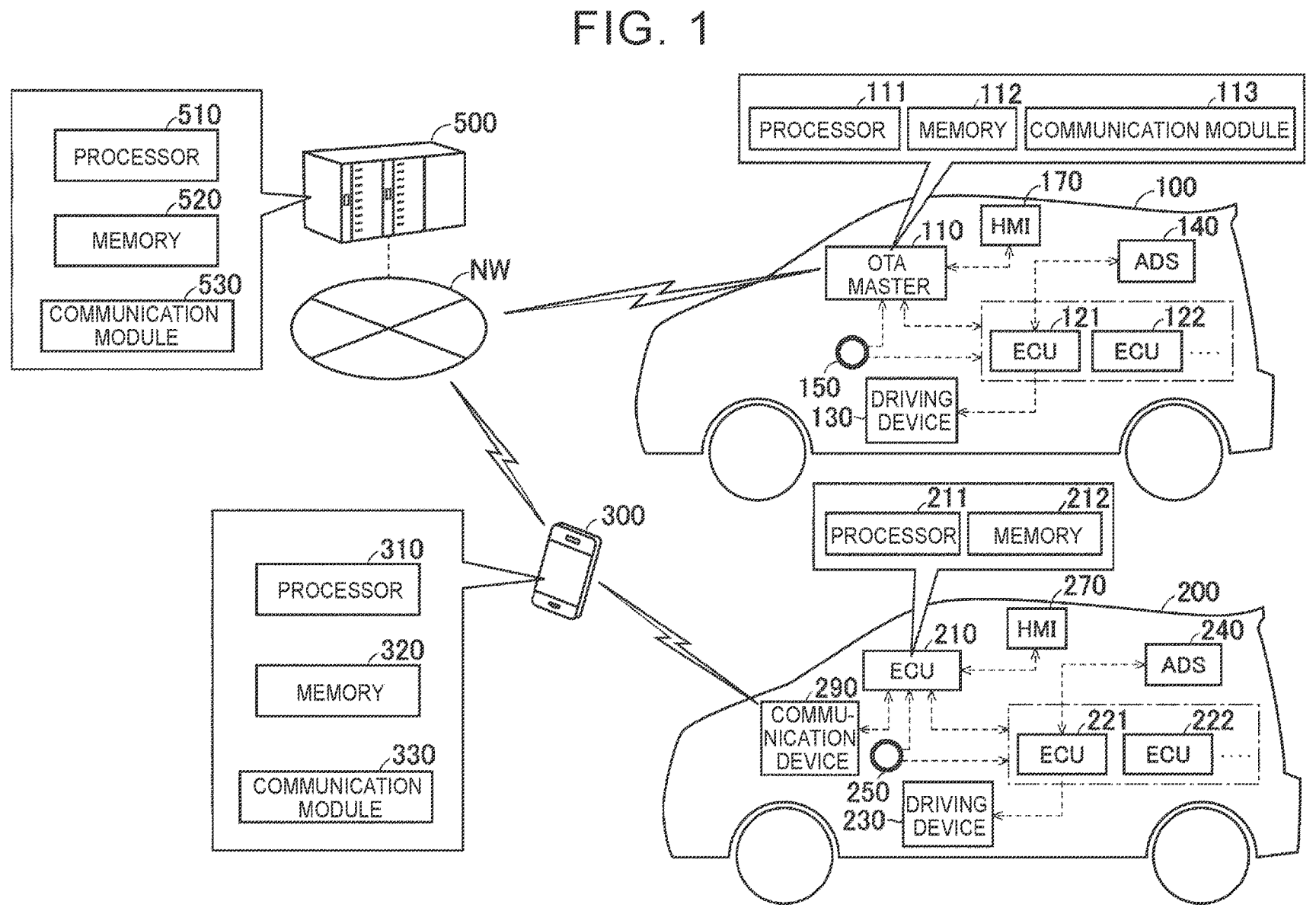

FIG. 1 shows the configuration of a software distribution system according to the present embodiment. Referring to FIG. 1, this software distribution system includes a vehicle 100, a vehicle 200, mobile equipment 300, and an OTA center 500. "OTA" is an abbreviation for "Over The Air."

Each of the vehicles 100, 200 is, for example, a battery electric vehicle (BEV) that does not include an internal combustion engine. The vehicle 100 has an OTA access function (function to wirelessly communicate directly with the OTA center 500), but the vehicle 200 does not have the OTA access function. That is, the vehicle 100 can wirelessly communicate directly with the OTA center 500, but the vehicle 200 cannot communicate with the OTA center 500 without via another communication device (i.e., a communication device different from that mounted on the vehicle 200 itself). Specifically, the vehicle 200 wirelessly communicates with the OTA center 500 via the mobile equipment 300.

The mobile equipment 300 is configured to be carried around by a user. The mobile equipment 300 is carried and operated by a user of the vehicle 200 (vehicle manager). In the present embodiment, a smartphone with a touch panel display is used as the mobile equipment 300. The smartphone contains a computer and has a speaker function. However, the mobile equipment 300 is not limited to this, and any equipment that can be carried by the user of the vehicle 200 can be used as the mobile equipment 300. For example, a laptop, a tablet, a portable gaming device, and a wearable device (such as a smartwatch, smart glasses, and smart gloves) can also be used as the mobile equipment 300.

The mobile equipment 300 includes a processor 310, a memory 320, and a communication module 330. The processor 310 includes, for example, a central processing unit (CPU). The memory 320 includes a non-volatile memory such as a flash memory. The communication module 330 includes a communication interface (UF) for direct wireless communication with the OTA center 500. The communication module 330 also includes a communication OF for direct wireless communication with the vehicle 200. The mobile equipment 300 mediates communication between the vehicle 200 and the OTA center 500. For example, the mobile equipment 300 specifies the address of the OTA center 500 and accesses a communication network NW in response to a request from the vehicle 200. The vehicle 200 (ECU 210) can thus communicate with the OTA center 500 via the mobile equipment 300 (communication module 330). Wireless communication is established between the vehicle 200 and the OTA center 500 in this manner.

Application software (hereinafter referred to as "mobile app") for using a service provided by the OTA center 500 is installed in the mobile equipment 300. Identification information (equipment identification (ID)) of the mobile equipment 300 is registered in the OTA center 500 in association with identification information (vehicle ID) of the vehicle 200 through the mobile app. The mobile equipment 300 can send and receive information to and from the OTA center 500 through the mobile app.

The OTA center 500 is a server that provides a vehicle software update service using the OTA technology. The OTA center 500 is configured to perform a software update on an in-vehicle ECU remotely from the OTA center 500 via a communication section. The OTA center 500 distributes software for the in-vehicle ECU. The term "ECU" means an electronic control unit.

The OTA center 500 includes a processor 510, a memory 520, and a communication module 530. The processor 510 includes, for example, a CPU. The memory 520 includes a non-volatile memory such as a flash memory. The communication module 530 is connected to the communication network NW by wire, and communicates with each of a plurality of vehicles (including the vehicle 100) and a plurality of pieces of mobile equipment (including the mobile equipment 300) via the communication network NW. The communication network NW is a wide area network formed by, for example, the Internet and wireless base stations. The communication network NW may include a mobile phone network.

The vehicle 100 includes an OTA master 110 and a plurality of ECUs (including ECUs 121, 122). The vehicle 200 includes a plurality of ECUs (including ECUs 210, 221, and 222). The OTA master 110 contains a computer and functions as an in-vehicle diagnostic device. Each vehicle may include any number of ECUs. Each in-vehicle ECU contains a computer that includes at least one processor and at least one memory. Each in-vehicle ECU may include a plurality of microcomputers in the form of, for example, a main microcomputer and a sub-microcomputer.

In the vehicle 100, the OTA master 110 and each ECU are connected to each other via a communication bus, and are configured to communicate with each other by wire. In the vehicle 200, the ECUs are connected to each other via a communication bus, and are configured to communicate with each other by wire. The method for communication between the control devices in each vehicle may be, for example, but is not particularly limited to, a Controller Area Network (CAN) or Ethernet (registered trademark).

The OTA master 110 includes a processor 111, a memory 112, and a communication module 113. The processor 111 includes, for example, a CPU. The memory 112 includes a non-volatile memory such as a flash memory. The communication module 113 includes a communication OF for direct wireless communication with the OTA center 500. For example, the communication module 113 specifies the address of the OTA center 500 and accesses the communication network NW. Wireless communication is thus established between the vehicle 100 (communication module 113) and the OTA center 500. The communication module 113 may include a telematics control unit (TCU) and/or a Data Communication Module (DCM) that performs wireless communication.

The ECU 210 includes a processor 211 and a memory 212. The processor 211 includes, for example, a CPU. The memory 212 includes a non-volatile memory such as a flash memory. The vehicle 200 further includes a communication device 290. The ECU 210 communicates with devices outside the vehicle 200 through the communication device 290. The communication device 290 includes a communication I/F for direct wireless communication with the mobile equipment 300. The communication device 290 and the mobile equipment 300 may perform short-range communication by, for example, a wireless local area network (LAN), near field communication (NFC), or Bluetooth (registered trademark). The communication device 290 may communicate directly with the mobile equipment 300 that is present inside the vehicle 200 or within a range around the vehicle 200. The mobile equipment 300 that is present inside or outside the vehicle 200 and the ECU 210 may send and receive information to and from each other via the communication device 290 while the vehicle 200 is at a complete stop. The mobile equipment 300 that is present inside the vehicle 200 and the ECU 210 may send and receive information to and from each other via the communication device 290 while the vehicle 200 is traveling. The ECU 210 can communicate with the OTA center 500 via the mobile equipment 300 by requesting the mobile equipment 300 to communicate with the OTA center 500 as described above.

The communication device 290 may further include a communication OF for wired communication with a scan tool, not shown (dedicated tool for wired software update). The ECU 210 may communicate by wire with the scan tool connected to an in-vehicle data link connector (DLC), not shown, via the communication device 290.

As described above, each of the OTA master 110 of the vehicle 100 and the ECU 210 of the vehicle 200 is configured to communicate wirelessly with the OTA center 500. Each of the vehicles 100, 200 can communicate with the OTA center 500 both while the vehicle is at a complete stop and while the vehicle is traveling. Each of the OTA master 110 and the ECU 210 manages in-vehicle information, receives a campaign, and manages a software update sequence. Hereinafter, the OTA master 110 and the ECU 210 will be referred to as "update masters" when not distinguished from each other. That is, the OTA master 110 is the update master of the vehicle 100, and the ECU 210 is the update master of the vehicle 200.

The vehicles 100, 200 are autonomous vehicles configured to perform automated driving. More specifically, the vehicles 100, 200 are configured to perform both manned travel and unmanned travel. Although the vehicles 100, 200 are configured to perform unmanned autonomous travel, the vehicles 100, 200 can also be manually driven by the user (manned travel). The vehicles 100, 200 can also perform automated driving (e.g., auto cruise control) during manned travel. The level of automated driving may be fully automated driving (level 5), or may be conditional automated driving (e.g., level 4).

Each of the vehicles 100, 200 further includes a driving device 130, 230 and an autonomous driving system (ADS) 140, 240, respectively. In the vehicle 100, the ECU 121 is configured to control the driving device 130. In the vehicle 200, the ECU 221 is configured to control the driving device 230.

Each of the driving devices 130, 230 includes an accelerator device, a brake device, and a steering device. The accelerator device includes, for example, a motor generator (hereinafter referred to as "MG") that rotates driving wheels of the vehicle, a power control unit (PCU) that drives the MG, and a battery that supplies electric power for driving the MG to the PCU. The MG functions as a travel motor for the vehicle. The brake device includes, for example, a braking device provided for each of the wheels of the vehicle, and an actuator that drives the braking device. The steering device includes, for example, an electric power steering system (EPS) and an actuator that drives the EPS.

Each of the ADSs 140, 240 includes a perception sensor that perceives the surroundings of the vehicle (e.g., at least one of the following sensors: a camera, a millimeter wave radar, and a Light Detection and Ranging (LiDAR) sensor). Each of the ADSs 140, 240 performs a process related to automated driving, based on information sequentially acquired by the perception sensor. Specifically, each of the ADSs 140, 240 cooperates with the ECU 121, 221 to generate a travel plan (information indicating the future behavior of the vehicle) according to the surroundings of the vehicle, respectively. Each of the ADSs 140, 240 then requests the ECU 121, 221 to control various actuators in the driving device 130, 230 to cause the vehicle 100, 200 to travel according to the travel plan, respectively.

In the present embodiment, the ADS is built into the vehicle. However, the ADS is not limited to this, and may be an automated driving kit that can be removably mounted on the vehicle. A sensor unit (including the perception sensor) of the automated driving kit may be attached to a rooftop of the vehicle.

Each of the vehicles 100, 200 further includes a start switch 150, 250 and a human-machine interface (HMI) 170, 270, respectively.

Each of the start switches 150, 250 is a switch for the user to start a vehicle system (control system for the vehicle 100, 200, respectively), and is installed in, for example, a vehicle cabin. The start switch is commonly referred to as "power switch" or "ignition switch." The vehicle system (including each ECU mounted on the vehicle) is switched between on (activated) and off (deactivated) when the user operates the start switch 150, 250. By turning on the start switch 150, 250, the vehicle system in the deactivated state is started and brought into the activated state (hereinafter also referred to as "IG-ON"). By turning off the start switch 150, 250 while the vehicle system is in the activated state, the vehicle system is brought into the deactivated state (hereinafter also referred to as "IG-OFF").

The operation to turn on the start switch 150, 250 is an operation to switch the state of the vehicle from IG-OFF to IG-ON. When the user turns on the start switch 150, 250, a start request is input to each in-vehicle ECU. That is, each in-vehicle ECU receives the start request from the user. The operation to turn off the start switch 150, 250 is an operation to switch the state of the vehicle from IG-ON to IG-OFF. When the user turns off the start switch 150, 250, a shutdown request is input to each in-vehicle ECU. That is, each in-vehicle ECU receives the shutdown request from the user. The operation to turn off the start switch 150, 250 is prohibited while the vehicle is traveling.

Each of the HMIs 170, 270 includes an input device and a display device. Each of the HMIs 170, 270 may include a touch panel display that functions as both an input device and a display device. Each of the HMIs 170, 270 may include an information display or a telltale as the display device. Each of the HMIs 170, 270 may include a steering switch as the input device. At least one of the following may function as each of the HMIs 170, 270: an in-vehicle infotainment (IVI) system, an instrument panel, and a head-up display. Each of the HMIs 170, 270 may include an input device and a display device of a car navigation system.

FIG. 2 illustrates an overview of a software update method according to the present embodiment. Referring to FIG. 2 together with FIG. 1, a process related to software update (more specifically, an update of vehicle software using the OTA technology) is performed according to a procedure including configuration synchronization, campaign notification and acceptance of application, download, installation, activation, and software update completion notification. The process described below is performed by the OTA center 500 and each vehicle (including the vehicles 100, 200) that receives software distribution from the OTA center 500. The number of vehicles that receive the distribution from the OTA center 500 may be about 50, may be 100 or more and less than 1000, or may be 1000 or more.

The vehicle in the IG-ON state repeats the configuration synchronization every preset period. The vehicle in the IG-ON state also performs the configuration synchronization when it receives a request for configuration synchronization from the OTA center 500. The process of configuration synchronization by the vehicle includes sending vehicle configuration information to the OTA center 500. The vehicle configuration information includes, for example, hardware information (information indicating product numbers of hardware, identifiers of the ECUs, etc.) and software information (information indicating product numbers of software, etc.) of the individual ECUs in the vehicle.

When the OTA center 500 receives the vehicle configuration information from the vehicle, the OTA center 500 checks for any currently available campaign (software update). When there is any campaign that is applicable to the vehicle, the OTA center 500 sends an accept request signal that requests the user of the vehicle to accept to download new software (updated version of software) related to that campaign. The accept request signal includes information on the campaign (campaign information). The campaign information may include, for example, at least one of the following pieces of information: campaign attribute information (information indicating the purpose of the software update, the function(s) of the vehicle that may be affected by the update, etc.), a list of vehicles eligible for the campaign, information on ECUs eligible for the campaign (e.g., software information before and after the update), and information on notifications to be sent to the user before and after the update. The campaign to be notified may be a newly available campaign or may be a campaign that was not previously applied. Hereinafter, sending of the accept request signal will also be referred to as "campaign notification."

When the vehicle receives a campaign notification (accept request signal), the vehicle requests the user to enter whether to accept to apply the campaign to the vehicle. For example, the vehicle displays a message such as "New software is available. Do you want to apply this software to this vehicle?" on the in-vehicle HMI (e.g., HMI 170, 270) to request the user to enter an input indicating either "accept" or "decline." When the user enters an input indicating "accept," the vehicle performs a process related to download that will be described below. When the user enters an input indicating "decline," the vehicle does not perform the process related to download. In this case, the OTA center 500 ends the process related to software update without proceeding to a download phase.

In the present embodiment, the OTA center 500 and the update master of the vehicle (e.g., the OTA master 110 or the ECU 210) perform the process related to download according to the following procedure.

The update master of the vehicle requests the OTA center 500 to distribute a distribution package including the new software. The update master then downloads (receives and saves) the distribution package while wirelessly communicating with the OTA center 500. The distribution package may include, in addition to the new software (e.g., a set of update data for each of the ECUs eligible for the campaign), package attribute information (information indicating the update category, the number of pieces of update data in the distribution package, the order of installation for each ECU, etc.), and update data attribute information (an identifier of a target ECU, verification data for verifying the validity of the update data, etc.). The target ECU is an ECU whose software is to be updated. For example, the target ECU may be the ECU 121 or 221, and the software to be updated may be an automated driving control program.

The distribution package is saved in a storage device (e.g. the memory 112 or 212) of the update master through the process related to download described above. During the download, the in-vehicle HMI informs the user of the progress of the download. After the download is completed, the update master verifies the authenticity of the downloaded distribution package. When the verification result is "normal," the update master notifies the OTA center 500 of the software update status (completion of the download). This notification means that the download was successful.

After the successful download, the vehicle performs installation. Specifically, the update master requests at least one target ECU (e.g. the ECU 121 or 221) to output the state of the target ECU and a diagnostic trouble code (DTC). The update master determines for each target ECU whether installation can be performed, based on the state of the target ECU and the DTC. The update master transfers the new software (update data) to the target ECU for which installation can be performed. When the target ECU receives the update data, the target ECU installs the received update data (writes the received update data to a non-volatile memory). During the installation, the in-vehicle HMI informs the user of the progress of the installation.

When the transfer of the update data from the update master to the target ECU is completed, the target ECU sends a transfer completion notification to the update master. When the update master receives the transfer completion notification, the update master requests the target ECU to perform integrity verification. In response to this request, the target ECU performs verification using integrity verification data (verification data), and sends the verification result to the update master. The update master saves the verification result (whether the installation was completed, failed, or was cancelled) from each target ECU. When the integrity verification is completed by all the target ECUs and the verification results from all the target ECUs are "normal," the update master notifies the OTA center 500 of the software update status (completion of the installation). This notification means that the installation was successful.

After the installation is successfully performed following the successful download, the vehicle waits for activation. When the start switch (e.g., the start switch 150 or 250) of the vehicle is subsequently turned off, the update master displays a predetermined message on the in-vehicle HMI to request the user to enter an input indicating either "accept" or "decline." When the user enters an input indicating "accept" to the in-vehicle HMI, the update master performs activation (activation of the installed software). In the case where the update master fails to activate the installed software, the update master requests the OTA center 500 to rollback the software. In response to the rollback request from the vehicle, the OTA center 500 distributes rollback software to the vehicle. The update master can thus restore (roll back) the software that failed to be activated to its original version by using the rollback software. When the user enters an input indicating "decline" to the in-vehicle HMI, the update master cancels the process related to software update without performing activation, and the vehicle system is shut down.

When the update master has successfully activated the installed software, the update master displays the result of the software update on the in-vehicle HMI. The in-vehicle HMI displays, for example, a software update completion screen indicating that the update was successful. The update master then notifies the OTA center 500 of the software update status (completion of the software update). This notification means that the OTA software update was successful. In response to this notification, the control system for the vehicle is shut down, and the vehicle system is switched to IG-OFF. When the start switch of the vehicle is subsequently turned on, the vehicle system is switched to IG-ON. An update program (new version of the software) is thus started on the target ECU.

The software to be updated is not limited to a control program for a driver assistance system such as the automated driving control program described above, and may be any software. In the present embodiment, the OTA center 500 distributes software for a recall (hereinafter also referred to as "recall SW"). The OTA center 500 also distributes, as software not for a recall (hereinafter also referred to as "non-recall SW"), software related to driving control (hereinafter also referred to as "driving control SW") and software related to entertainment (hereinafter also referred to as "entertainment SW"). Examples of the driving control SW include control programs for the driver assistance system described above and control programs for manual driving (e.g., software for accelerator control, brake control, or steering control). The driving control SW may be a control program for the driving device 130, 230 or the ADS 140, 240. Examples of the entertainment SW include programs for display system control such as augmented reality (AR) control and programs for updating information (e.g., map information) to be used in the display system control. The entertainment SW may be a control program for the HMI 170, 270.

Identification information (vehicle ID) of each vehicle (including the vehicles 100, 200) that receives the vehicle software update service from the OTA center 500 is registered in advance in the OTA center 500. A storage device (e.g., the memory 520) of the OTA center 500 stores information on each vehicle (hereinafter also referred to as "vehicle information") in association with the vehicle ID. As shown in FIG. 2, the vehicle information includes information indicating whether each vehicle is a first vehicle or a second vehicle. The first vehicle is a vehicle that wirelessly communicates with the OTA center 500 and receives software distributed by the OTA center 500 directly from the OTA center 500. The second vehicle is a vehicle that is configured to communicate with mobile equipment that wirelessly communicates with the OTA center 500, and that receives software distributed by the OTA center 500 via the mobile equipment. For example, the vehicle 100 is the first vehicle, and the vehicle 200 is the second vehicle. The vehicle information further includes a communication address of each vehicle (for the second vehicle, a communication address of the mobile equipment). As shown in FIG.

2, the vehicle information further includes information indicating whether each vehicle has subscribed to a premium service. The premium service is a service that allows to receive priority software distribution from the OTA center 500. For example, a vehicle user can subscribe to the premium service by signing a subscription contract with a service provider.

FIG. 3 is a flowchart showing the procedure of a software distribution method according to the present embodiment. A series of steps shown in this flowchart is executed by the OTA center 500 at predetermined cycles. This execution cycle may be a fixed value, or may be variable depending on the situation (e.g., campaign availability, number of vehicles waiting for distribution, processing load, and communication capacity). In the present embodiment, the OTA center 500 is an example of the "server" according to the present disclosure, and the processor 510 shown in FIG. 1 serves as an example of the "first classification unit," the "distribution control unit," and the "second classification unit" according to the present disclosure. "S" in the flowchart means a step. "SW" means software. The following process of the flowchart is implemented by one or more processors reading and executing a program stored in one or more memories.

Referring to FIG. 3 together with FIGS. 1 and 2, in S11, the OTA center 500 requests each vehicle registered in the OTA center 500 to perform configuration synchronization. The OTA center 500 receives vehicle configuration information from each vehicle that has performed the configuration synchronization. In S12, the OTA center 500 then performs campaign notification to each vehicle to which a campaign is applicable. Thereafter, in S13, the OTA center 500 checks each vehicle's reply to the campaign notification. Specifically, the OTA center 500 determines those vehicles that have replied "accept" to the campaign notification (i.e., those vehicles requesting the OTA center 500 to distribute a distribution package) to be distribution targets. When the OTA center 500 receives a rollback request from any vehicle, the OTA center 500 also adds that vehicle to the distribution targets. In S13, the OTA center 500 checks the identification information (vehicle ID) of each vehicle included in the distribution targets and the distribution package or rollback software requested by each vehicle.

Subsequently, in S14, the OTA center 500 determines whether the distribution targets (S13) include any vehicle requesting recall SW (distribution package) (hereinafter also referred to as "8C vehicle"). When the distribution targets include any 8C vehicle (YES in S14), the process proceeds to S20. The 8C vehicle included in the distribution targets is a vehicle that is to receive distribution of the recall SW (i.e., a vehicle belonging to an eighth category).

Figure 4:
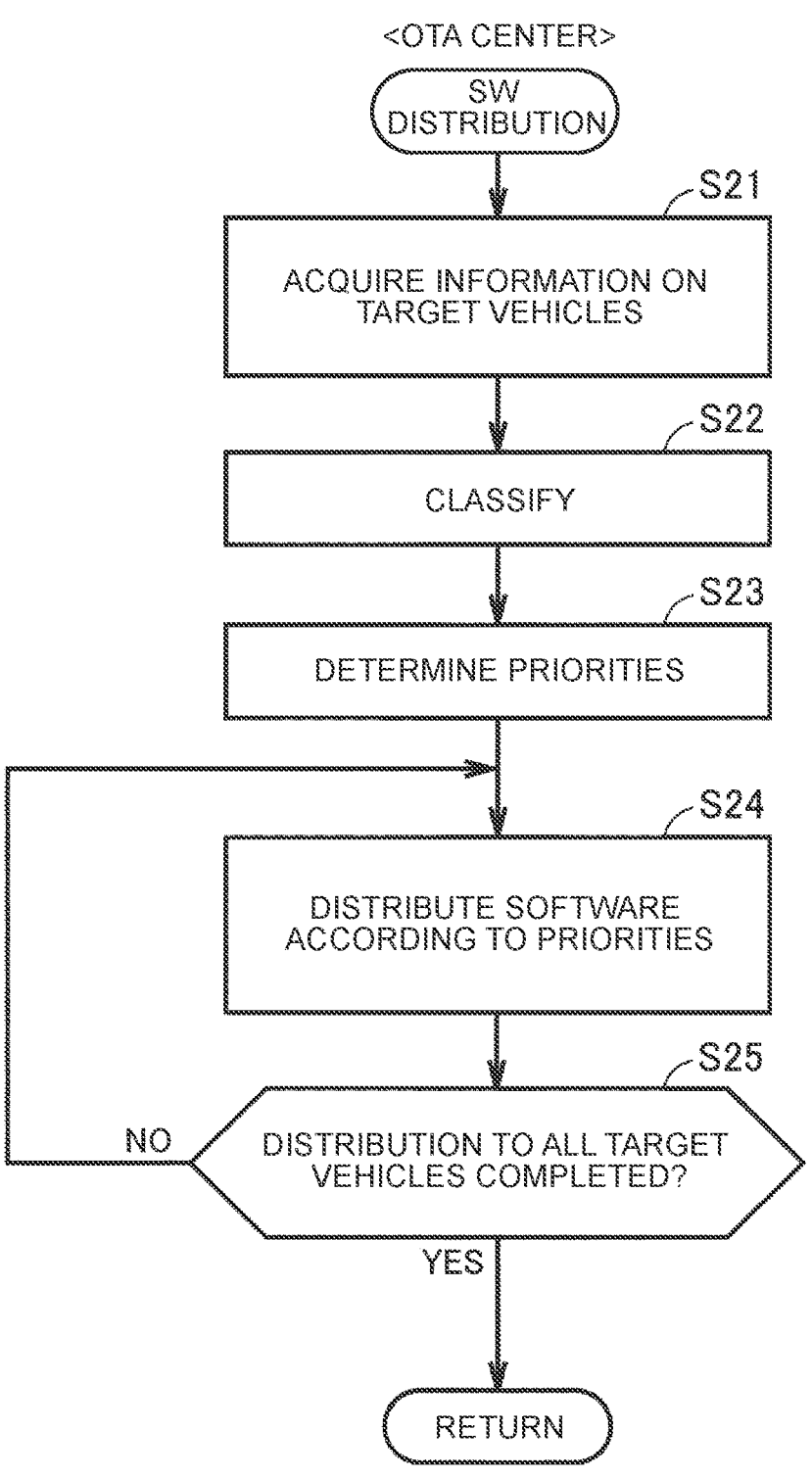
FIG. 4 is a flowchart showing the procedure of software distribution in the software distribution method shown in FIG. 3.

In S20, the OTA center 500 executes a series of steps shown in FIG. 4, which will be described below. FIG. 4 is a flowchart of a process related to software distribution that is performed by the OTA center 500 in S20.

Referring to FIG. 4 together with FIGS. 1 and 2, in S21, the OTA center 500 acquires information on target vehicles (e.g., the vehicle information shown in FIG. 2). When YES in S14 of FIG. 3, each 8C vehicle included in the distribution targets (S13) is a target vehicle.

In S22, the OTA center 500 classifies the target vehicles into the first vehicle and the second vehicle based on the vehicle information shown in FIG. 2. For example, a target vehicle having a configuration similar to that of the vehicle 100 in FIG. 1 is classified as the first vehicle. A target vehicle having a configuration similar to that of the vehicle 200 in FIG. 1 is classified as the second vehicle.

In S23, the OTA center 500 determine priorities of distribution to the target vehicles. The OTA center 500 according to the present embodiment gives a target vehicle classified as the second vehicle a higher priority than a target vehicle classified as the first vehicle.

When there is a plurality of target vehicles classified as the first vehicle, the priorities of the first vehicles can be determined by any method. For example, the priorities of the first vehicles may be set such that the first vehicle that has been using pre-update software for a longer period of time, that is, the first vehicle that started using the pre-update software earlier in date and time (e.g., earlier in date and time of activation), has a higher priority. Alternatively, the priorities of the first vehicles may be set such that the first vehicle that replied "accept" faster has a higher priority. When there is a plurality of target vehicles classified as the second vehicle, the priorities of the second vehicles can be determined by any method like the first vehicles.

In S24, the OTA center 500 distributes software to each target vehicle according to the priorities determined in S23. Subsequently, in S25, the OTA center 500 determines whether the software distribution to all the target vehicles is completed. The software distribution (S24) is continued as long as NO in S25. In S24, the OTA center 500 performs software distribution to the target vehicles in descending order of priority. That is, the target vehicle with a higher priority will receive the software distribution faster. In the present embodiment, the OTA center 500 prioritizes the software distribution to the second vehicle over the software distribution to the first vehicle. When YES in S14 of FIG. 3, the recall SW is distributed in S24.

When the software distribution to all the target vehicles is completed (YES in S25), the series of steps in FIGS. 4 and S20 in FIG. 3 end. The target vehicles having received the distribution in S20 download (receive and save) the distributed software, and update software according to the procedure shown in FIG. 2. After S20 is executed, the series of steps shown in FIG. 3 is ended, but is started again according to the execution cycle. Accordingly, S11 to S13 described above are executed, and then the determination of S14 is made again. When the distribution of the recall SW has been completed, the determination result in S14 is NO, and the process proceeds to S15. In the present embodiment, the OTA center 500 does not distribute non-recall SW (see S15 to S18) until the distribution of the recall SW is completed. Therefore, software distribution to the 8C vehicle described above (vehicle that is to receive distribution of the recall SW) is prioritized over software distribution to the vehicle that is to receive distribution of the non-recall SW (vehicle belonging to a seventh category).

Referring again to FIG. 3 together with FIGS. 1 and 2, in S15, the OTA center 500 determines whether the distribution targets (S13) include any vehicle requesting rollback of driving control SW (hereinafter also referred to as "6C vehicle"). When the distribution targets include any 6C vehicle (YES in S15), the process proceeds to S20. The 6C vehicle included in the distribution targets is a vehicle that is to receive distribution of rollback software related to driving control (i.e., a vehicle belonging to a sixth category).

When YES in S15 as well, S20 described above (i.e., the series of steps shown in FIG. 4) is executed. However, when YES in S15, each 6C vehicle included in the distribution targets (S13) is a target vehicle, and in S24, the rollback software related to driving control is distributed to each 6C vehicle according to the priorities determined in S23. After the software distribution to all the target vehicles (6C vehicles) is completed (YES in S25), the series of steps shown in FIG. 3 is started again according to the execution cycle. Accordingly, S11 to S14 described above are executed, and then the determination of S15 is made again. When the distribution of the rollback software related to driving control has been completed, the determination result in S15 is NO, and the process proceeds to S16. In the present embodiment, the OTA center 500 does not distribute non-rollback software related to driving control (S16) until the distribution of the rollback software related to driving control is completed. Therefore, software distribution to the 6C vehicle described above (vehicle that is to receive distribution of the rollback software related to driving control) is prioritized over software distribution to a 5C vehicle described below (vehicle that is to receive distribution of the non-rollback software related to driving control).

In S16, the OTA center 500 determines whether the distribution targets (S13) include any vehicle requesting driving control SW (distribution package) (hereinafter also referred to as "5C vehicle"). When the distribution targets include any 5C vehicle (YES in S16), the process proceeds to S20. The 5C vehicle included in the distribution targets is a vehicle that is to receive distribution of the non-rollback software related to driving control (distribution package) (i.e., a vehicle belonging to a fifth category).

When YES in S16 as well, S20 described above (i.e., the series of steps shown in FIG. 4) is executed. However, when YES in S16, each 5C vehicle included in the distribution targets (S13) is a target vehicle, and in S24, the non-rollback software related to driving control is distributed to each 5C vehicle according to the priorities determined in S23. After the software distribution to all the target vehicles (5C vehicles) is completed (YES in S25), the series of steps shown in FIG. 3 is started again according to the execution cycle. Accordingly, S11 to S15 described above are executed, and then the determination of S16 is made again. When the distribution of the non-rollback software related to driving control has been completed, the determination result in S16 is NO, and the process proceeds to S17.

In S17, the OTA center 500 determines whether the distribution targets (S13) include any vehicle requesting rollback of entertainment SW (hereinafter also referred to as "4C vehicle"). When the distribution targets include any 4C vehicle (YES in S17), the process proceeds to S20. The 4C vehicle included in the distribution targets is a vehicle that is to receive distribution of rollback software related to entertainment (i.e., a vehicle belonging to a fourth category).

When YES in S17 as well, S20 described above (i.e., the series of steps shown in FIG. 4) is executed. When YES in S17, each 4C vehicle included in the distribution targets (S13) is a target vehicle. In S23, the OTA center 500 gives a target vehicle classified as the second vehicle a higher priority than a target vehicle classified as the first vehicle. When there is a plurality of target vehicles classified as the first vehicle, the OTA center 500 gives the first vehicle subscribing to the premium service a higher priority than the first vehicle not subscribing to the premium service. When there is a plurality of target vehicles classified as the second vehicle, the OTA center 500 gives the second vehicle subscribing to the premium service a higher priority than the second vehicle not subscribing to the premium service. For those vehicles that have the same priority even after the priorities are determined based on whether the vehicle has subscribed to the premium service as described above, the OTA center 500 may determine the priorities of these vehicles based on the date and time the vehicle started using pre-update software, the timing the vehicle replied "accept," etc. In S24, the rollback software related to entertainment is distributed to each 4C vehicle according to the priorities determined in S23. After the software distribution to all the target vehicles (4C vehicles) is completed (YES in S25), the series of steps shown in FIG. 3 is started again according to the execution cycle. Accordingly, S11 to S16 described above are executed, and then the determination of S17 is made again. When the distribution of the rollback software related to entertainment has been completed, the determination result in S17 is NO, and the process proceeds to S18. In the present embodiment, the OTA center 500 does not distribute non-rollback software related to entertainment (S18) until the distribution of the rollback software related to entertainment is completed. Therefore, software distribution to the 4C vehicle described above (vehicle that is to receive distribution of the rollback software related to entertainment) is prioritized over software distribution to a 3C vehicle described below (vehicle that is to receive distribution of the non-rollback software related to entertainment).

In S18, the OTA center 500 determines whether the distribution targets (S13) include any vehicle requesting entertainment SW (distribution package) (hereinafter also referred to as "3C vehicle"). When the distribution targets include any 3C vehicle (YES in S18), the process proceeds to S20. The 3C vehicle included in the distribution targets is a vehicle that is to receive distribution of the non-rollback software related to entertainment (distribution package) (i.e., a vehicle belonging to a third category).

When YES in S18 as well, S20 described above (i.e., the series of steps shown in FIG. 4) is executed. When YES in S18, each 3C vehicle included in the distribution targets (S13) is a target vehicle. In S23, the OTA center 500 gives a target vehicle classified as the second vehicle a higher priority than a target vehicle classified as the first vehicle. When there is a plurality of target vehicles classified as the first vehicle, the OTA center 500 gives the first vehicle subscribing to the premium service a higher priority than the first vehicle not subscribing to the premium service. When there is a plurality of target vehicles classified as the second vehicle, the OTA center 500 gives the second vehicle subscribing to the premium service a higher priority than the second vehicle not subscribing to the premium service. For those vehicles that have the same priority even after the priorities are determined based on whether the vehicle has subscribed to the premium service as described above, the OTA center 500 may determine the priorities of these vehicles based on the date and time the vehicle started using pre-update software, the timing the vehicle replied "accept," etc. In S24, the non-rollback software related to entertainment is distributed to each 3C vehicle according to the priorities determined in S23. When the software distribution to all the target vehicles (3C vehicles) is completed (YES in S25), the series of steps shown in FIG. 3 ends. However, the series of steps shown in FIG. 3 is started again according to the execution cycle.

According to the processes shown in FIGS. 3 and 4, software distribution is performed according to the priorities shown in FIG. 5. FIG. 5 shows the priorities of distribution determined by the software distribution method according to the present embodiment.

Referring to FIG. 5, the OTA center 500 prioritizes software distribution to the vehicles that are to receive distribution of the driving control SW (vehicles belonging to a second category) over software distribution to the vehicles that are to receive distribution of the entertainment SW (vehicles belonging to a first category). The OTA center 500 prioritizes software distribution to the vehicles that are to receive distribution of the rollback software (vehicles belonging to the fourth and sixth categories) over software distribution to the vehicles that are to receive distribution of the non-rollback software (vehicles belonging to the third and fifth categories). The OTA center 500 prioritizes software distribution to the vehicles that are to receive distribution of the recall software (vehicles belonging to the eighth category) over software distribution to the vehicles that are to receive distribution of the non-recall software (vehicles belonging to the seventh category). When distributing the entertainment SW to a plurality of first vehicles, the OTA center 500 prioritizes the distribution to the first vehicle subscribing to the premium service over the distribution to the first vehicle not subscribing to the premium service. When distributing the entertainment SW to a plurality of second vehicles, the OTA center 500 prioritizes the distribution to the second vehicle subscribing to the premium service over the distribution to the second vehicle not subscribing to the premium service.

As described above, the software distribution system according to the present embodiment includes the OTA center 500 (server), the vehicles (including the vehicles 100, 200), and the mobile equipment 300. The mobile equipment 300 is configured to send software acquired from the OTA center 500 to the vehicle 200 by wireless communication. The OTA center 500 includes: the first classification unit (S22 in FIG. 4) that classifies a plurality of vehicles that is software distribution targets into the first vehicle and the second vehicle; the distribution control unit (S23, S24 in FIG. 4) that prioritizes software distribution to the second vehicle over software distribution to the first vehicle; and the second classification unit (S14 to S18 in FIG. 3) that classifies the vehicles according to the type of software to be distributed. In the present embodiment, when performing software distribution to each vehicle classified into the same category by the second classification unit, the distribution control unit prioritizes the distribution to the second vehicle over the distribution to the first vehicle (see FIG. 5).

The transmission speed of the second vehicle tends to be lower than that of the first vehicle. In this respect, the OTA center 500 having the above configuration prioritizes the software distribution to the second vehicle over the software distribution to the first vehicle. By setting the priorities of software distribution to each vehicle, software distribution to the vehicles can be performed in an appropriate order. This can reduce a delay in software update on the second vehicle due to the variation in transmission speed between vehicles. The first classification unit, the second classification unit, and the distribution control unit may be implemented by dedicated hardware (electronic circuitry) rather than by software.

In a form in which the OTA center 500 performs distribution to 100 or more vehicles, the timing of distribution may greatly change due to the OTA center 500 changing the priorities of distribution as described above. For example, the OTA center 500 may perform software distribution to the vehicle with the highest priority and the vehicle with the lowest priority with a time lag of a week or more (e.g., about several weeks) therebetween.

The processes shown in FIGS. 3 and 4 can be changed as appropriate. For example, of S14 to S18 in FIG. 3, any step not suitable for the application may be omitted. FIG. 6 shows a modification of the process shown in FIG. 3. For example, in a form in which the vehicle rolls back software using the original version of software backed up in the vehicle without requesting a rollback from the OTA center 500, the process flow without S15 and S17 as shown in FIG. 6 may be used.

In the above embodiment, an on-premises server is used as the OTA center 500 (see FIG. 1). However, the present disclosure is not limited to this, and the functions of the OTA center 500 (e.g., a function related to software update) may be implemented on a cloud through cloud computing. That is, the OTA center 500 may be a cloud server.

The vehicle need not necessarily be a vehicle configured to perform automated driving. The vehicle may be an electrified vehicle (xEV) other than a BEV. The vehicle may be equipped with an internal combustion engine (e.g., a gasoline engine, a biofuel engine, or a hydrogen engine). The vehicle is not limited to a four-wheeled passenger vehicle, and may be a bus or a truck, or may be a three-wheeled xEV. The vehicle may have a flight function. The vehicle may be a Mobility-as-a-Service (MaaS) vehicle. The vehicle may be a multipurpose vehicle that is customized according to the user's intended use of the vehicle. The vehicle may be a mobile shop vehicle, a robotaxi, an automated guided vehicle (AGV), or an agricultural machine. The vehicle may be a small-sized unmanned or single-seater BEV (e.g., a last-mile BEV, an electric wheelchair, or an electric skateboard).

The above various modifications may be implemented in any combination. The embodiment disclosed herein should be construed as illustrative in all respects and not restrictive. The scope of the present disclosure is shown by the claims rather than by the above description of the embodiment and is intended to include all modifications within the meaning and scope equivalent to the claims.

A server according to a first aspect of the present disclosure is configured to distribute software. The server includes one or more processors configured to classify a plurality of vehicles that is software distribution targets into a first vehicle and a second vehicle, and to prioritize software distribution to the second vehicle over software distribution to the first vehicle. The first vehicle is configured to wirelessly communicate with the server and to receive the software distributed by the server directly from the server. The second vehicle is configured to communicate with mobile equipment that wirelessly communicates with the server, and to receive the software distributed by the server via the mobile equipment.

The server may function as an OTA center that distributes software. The first vehicle has a function to wirelessly communicate directly with the server (i.e., the OTA access function). The second vehicle wirelessly communicates with the server via the mobile equipment. In a system that includes the server, the first vehicle, and the second vehicle, the OTA transmission speed (amount of data sent and received per unit time) tends to vary greatly between vehicles. Since the second vehicle wirelessly communicates with the server via the mobile equipment, the transmission speed of the second vehicle tends to be lower than that of the first vehicle. Depending on the situation, such a great variation in transmission speed between vehicles can be a problem. For example, it takes a long time for a vehicle with a low transmission speed to receive software after the server starts distributing the software. Therefore, a software update may not be able to be performed at an appropriate timing.

Therefore, the above server prioritizes software distribution to the second vehicle over software distribution to the first vehicle. By setting the priorities of software distribution to each vehicle, software distribution to the vehicles can be performed in an appropriate order. This can reduce a delay in software update on the second vehicle due to the variation in transmission speed between vehicles.

In the above aspect, the one or more processors may further configured to classify the plurality of vehicles according to a type of the software to be distributed. The one or more processors may be configured to prioritize distribution to the second vehicle over distribution to the first vehicle when performing software distribution to each vehicle classified into a same category by the one or more processors.

According to the above configuration, when distributing the same software to two or more vehicles, the server can prioritize distribution to the second vehicle over distribution to the first vehicle.

In the above aspect, the s one or more processors may be configured to classify the plurality of vehicles into a first category and a second category, the first category being a category to which the vehicle that is to receive distribution of software related to entertainment belongs, and the second category being a category to which the vehicle that is to receive distribution of software related to driving control belongs. The one or more processors may be configured to prioritize software distribution to the vehicle belonging to the second category over software distribution to the vehicle belonging to the first category.

Distribution of the software related to driving control tends to be more urgent than distribution of the software related to entertainment. According to the above configuration, it becomes easier for the server to perform urgent software distribution fast.

In the above aspect, the one or more processors may be configured to further classify the vehicles classified into the first category into a third category and a fourth category, the third category being a category to which the vehicle that is to receive distribution of non-rollback software belongs, and the fourth category being a category to which the vehicle that is to receive distribution of rollback software belongs. The one or more processors may be configured to prioritize software distribution to the vehicle belonging to the fourth category over software distribution to the vehicle belonging to the third category. The one or more processors may be configured to further classify the vehicles classified into the second category into a fifth category and a sixth category, the fifth category being a category to which the vehicle that is to receive distribution of non-rollback software belongs, and the sixth category being a category to which the vehicle that is to receive distribution of rollback software belongs. The one or more processors may be configured to prioritize software distribution to the vehicle belonging to the sixth category over software distribution to the vehicle belonging to the fifth category.

According to the above configuration, it becomes easier for the server to perform urgent software distribution fast.

In the above aspect, the one or more processors may be configured to classify the plurality of vehicles into a seventh category and an eighth category, the seventh category being a category to which the vehicle that is to receive distribution of non-recall software belongs, and the eighth category being a category to which the vehicle that is to receive distribution of recall software belongs. The one or more processors may be configured to prioritize software distribution to the vehicle belonging to the eighth category over software distribution to the vehicle belonging to the seventh category.

According to the above configuration, it becomes easier for the server to perform urgent software distribution fast.

In the above aspect, the server may further include a storage device that stores information indicating whether each of the plurality of vehicles has subscribed to a premium service, the premium service being a service that allows to receive priority software distribution from the server. The one or more processors may be configured to prioritize distribution to the first vehicle subscribing to the premium service over distribution to the first vehicle not subscribing to the premium service when distributing predetermined software to a plurality of the first vehicles.

According to the above configuration, it becomes easier to perform software distribution fast to the vehicles of users who wish to receive software distribution fast (vehicles subscribing to the premium service).

In the above aspect, the predetermined software may be software related to entertainment.

If the order of software distribution is determined based on users' requests, urgent software distribution may be delayed. Therefore, in the above configuration, software distribution that can be received by subscribing to the premium service is distribution of the software related to entertainment that is less urgent. As a result, it becomes easier to perform distribution according to users' requests without interfering with urgent software distribution.

A software distribution system according to a second aspect of the present disclosure includes: the server of the first aspect; the plurality of vehicles; and the mobile equipment. The mobile equipment is configured to send the software acquired from the server to the second vehicle by wireless communication.

According to the above configuration, user convenience is improved.

In the above aspect, the mobile equipment may be a smartphone.

According to the above configuration, a system with high user convenience is implemented.

What is claimed is:

1. A server that distributes software, the server comprising one or more processors configured to:

acquire information on a plurality of target vehicles;

based on the acquired information on the target vehicles, classify each of the plurality of vehicles that are each software distribution targets into a first vehicle that wirelessly communicates directly with the server and receives the software distributed by the server directly from the server, and a second vehicle that cannot communicate directly with the server, and wirelessly communicates with mobile equipment and receives the software distributed by the server via the mobile equipment; and prioritize software distribution to the second vehicle over software distribution to the first vehicle based on whether the vehicles communicate directly with the server or via mobile equipment;

wherein the first vehicle is configured to wirelessly communicate with the server, and receive the software distributed by the server directly from the server, and the second vehicle is configured to communicate with mobile equipment that wirelessly communicates with the server, and receive the software distributed by the server via the mobile equipment; and the one or more processors are further configured to distribute the software to the first vehicle and the second vehicle in order of priority.

2. The server according to claim 1, wherein the one or more processors are further configured to classify the plurality of vehicles according to a type of the software to be distributed, wherein the one or more processors are configured to prioritize distribution to the second vehicle over distribution to the first vehicle when performing software distribution to each vehicle classified into a same category by the one or more processors.

3. The server according to claim 2, wherein the one or more processors are configured to:

classify the plurality of vehicles into a first category and a second category, the first category being a category to which the vehicle that is to receive distribution of software related to entertainment belongs, and the second category being a category to which the vehicle that is to receive distribution of software related to driving control belongs; and prioritize software distribution to the vehicle belonging to the second category over software distribution to the vehicle belonging to the first category.

4. The server according to claim 3, wherein the one or more processors are configured to:

further classify the vehicles classified into the first category into a third category and a fourth category, the third category being a category to which the vehicle that is to receive distribution of non-rollback software belongs, and the fourth category being a category to which the vehicle that is to receive distribution of rollback software belongs;

prioritize software distribution to the vehicle belonging to the fourth category over software distribution to the vehicle belonging to the third category;

further classify the vehicles classified into the second category into a fifth category and a sixth category, the fifth category being a category to which the vehicle that is to receive distribution of non-rollback software belongs, and the sixth category being a category to which the vehicle that is to receive distribution of rollback software belongs; and prioritize software distribution to the vehicle belonging to the sixth category over software distribution to the vehicle belonging to the fifth category.

5. The server according to claim 2, wherein the one or more processors are configured to:

classify the plurality of vehicles into a seventh category and an eighth category, the seventh category being a category to which the vehicle that is to receive distribution of non-recall software belongs, and the eighth category being a category to which the vehicle that is to receive distribution of recall software belongs; and prioritize software distribution to the vehicle belonging to the eighth category over software distribution to the vehicle belonging to the seventh category.

6. The server according to claim 1, further comprising a storage device that stores information indicating whether each of the plurality of vehicles has subscribed to a premium service, the premium service being a service that allows to receive priority software distribution from the server, wherein the one or more processors are configured to prioritize distribution to the first vehicle subscribing to the premium service over distribution to the first vehicle not subscribing to the premium service when distributing predetermined software to a plurality of the first vehicles.

7. The server according to claim 6, wherein the predetermined software is software related to entertainment.

8. A software distribution system, comprising:

the server according to claim 1;

the plurality of vehicles; and the mobile equipment, the mobile equipment being configured to send the software acquired from the server to the second vehicle by wireless communication.

9. The software distribution system according to claim 8, wherein the mobile equipment is a smartphone.

\* \* \* \* \*